W. M. SISTARE.
COURSE FINDER.
APPLICATION FILED SEPT. 27, 1916.
1,225,514. Patented May 8, 1917.
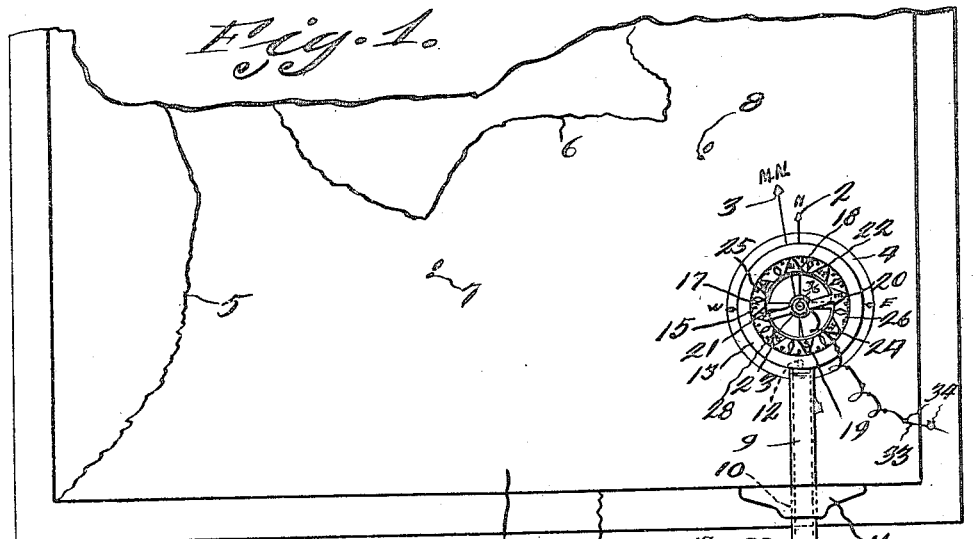
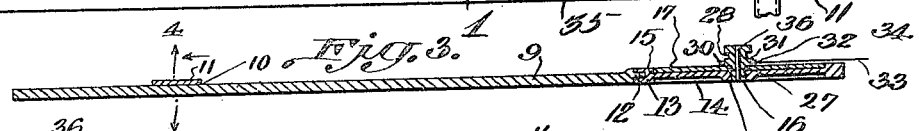
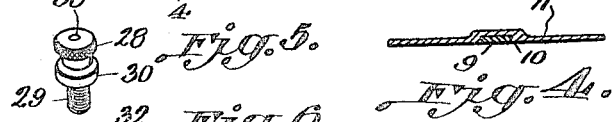
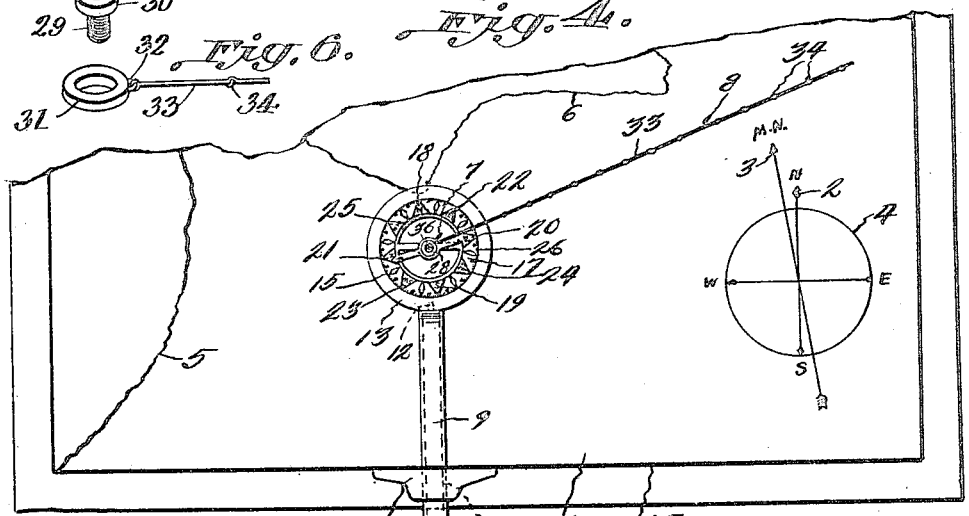
Witnesses
Inventor
W. M. Sistare
By
Attorneys

UNITED STATES PATENT OFFICE.

WILLIAM M. SISTARE, OF NEW LONDON, CONNECTICUT.

COURSE-FINDER.

1,225,514.  Specification of Letters Patent.  Patented May 8, 1917.

Application filed September 27, 1916. Serial No. 122,399.

*To all whom it may concern:*

Be it known that I, WILLIAM M. SISTARE, a citizen of the United States, residing at New London, in the county of New London, State of Connecticut, have invented a new and useful Course-Finder; and I do hereby declare the following to be a full, clear, and exact description of the invention, such as will enable others skilled in the art to which it appertains to make and use the same.

This invention relates to the art of navigation, and more particularly to an improved, efficient and practical course finder or protractor, whereby the true course of a vessel between two given points may be determined.

Heretofore, in navigation, the parallel ruler has been extensively employed, to determine the course of the vessel, and to attain the desired result or end in view, quite a number of moves of the rule are required.

Therefore, one of the objects of the present invention is to overcome these disadvantages, by providing an improved instrument of the above kind, which is simple, efficient and much easier to operate than the parallel ruler, by reason of its saving time and labor, it requiring but a single movement to find or determine any particular course.

A further object of the invention is to provide means to find the distance in nautical miles between two points, thus dispensing with the use of dividers.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a plan view of a chart, showing the instrument in use therewith, illustrating the initial use of the same.

Fig. 2 is a plan view of the chart, showing a second use or movement of the instrument.

Fig. 3 is a sectional view through the instrument or protractor.

Fig. 4 is a sectional view on line 4—4 of Fig. 3.

Fig. 5 is a detail perspective view of a thumb screw, whereby the dial of the instrument or protractor may be held set according to the variations between the true north and the magnetic north of the diagram of the compass drawn upon the chart.

Fig. 6 is a detail perspective view of the ring to be swiveled upon the thumb screw, and to which a silk cord may be connected, whereby the cord may be extended from one given point on the chart to another given point on said chart.

Referring more especially to the drawings, 1 designates a conventional form or diagram of a chart for use in navigation, showing the coast line, two predetermined points or buoys, and the usual border line of the chart, and also the diagram of a compass, disclosing the variations between the true north 2 and the magnetic north 3 of said compass 4. The coast lines are designated by the numerals 5 and 6, and the two predetermined points or buoys are denoted by the numerals 7 and 8. It is to be remembered that a chart to be used in navigating a considerable great distance consists of different sections, of which one section is shown in Fig. 1, and on each section the variation between the true north and the magnetic north varies. The instrument or protractor for finding or determining the course between the two points or buoys 7 and 8 comprises a blade 9, which is V-shaped in cross section substantially, and is dovetailed slidably and transversely in a dovetail recess 10 in a T-square head 11. Part 9 constitutes the T-square blade. One end of the blade 9 is provided with a reduced threaded extension 12, which is threaded into the peripheral edge portion of a circular disk 13. The opposite faces of the circular disk are provided with countersunken annular depressions 14 and 15. The disk 13 has a central opening, and mounted in the depression 15 is a circular disk 17. The disk 17 on one face is provided with markings indicating north, south, east and west, as shown at 18, 19, 20 and 21, and also markings or indications 22, 23, 24 and 25, indicating the northeast, southwest, the southeast and the northwest, and also graduations 26 subdividing these markings or indications. The disk 17 has a central opening 27, and 28 denotes a tubular thumb screw, the reduced part 29 of which extends through the opening 27, and is threaded into the opening 16 of the disk 13, and by tightening the thumb screw 28, the disk 17 may be held, so that the north indication may correspond or aline with the magnetic north of the compass 4 on the chart, whereby the dial of the instrument or protractor may be set according to the variations between the true north and the magnetic north. It is to be noted that the base 30 (which is adjacent the dial or disk 17 and tightens against the said dial or disk to hold it adjusted) of the thumb screw is tapering, and surrounding this base is a ring 31 having an eye 32, and by the tapering contour of said base, upward movement of the ring is prevented. However, the ring is allowed to swivel, and connected to the eye 32 is a suitable silk cord 33. Upon all sections of a chart, the scales of nautical miles or knots are used, but which in the present instance are not illustrated. However, this silk cord may be knotted, as shown in 34, or provided with any other suitable indications, corresponding to the nautical miles of the scale, and by these markings or indications or knots 34 of the cord, various distances upon the chart may be measured. For inland or river and lake navigation and coast navigation, this method of measuring distances may be found sufficient for practical purposes. In using the instrument or protractor, the instrument is placed on the chart so that the center of the compass 4 (which is drawn on the chart) is visible through the center of the bore of the tubular thumb screw. The T-square of the instrument is squared up accordingly. The dial or disk 17 is then set so that the north marking or indication 18 alines with the magnetic north 3, the thumb screw is then tightened to hold the dial in position. The instrument is moved, and by aid of the T-square, the same is squared to the border line 35, so that the point or buoy 7 is visible through the bore 36 of the thumb screw. Having adjusted the north indication or marking 18 to correspond or aline with the magnetic north, when the instrument is placed over the compass 4, the variation between the true north and the magnetic north is determined. Such variation having been determined, and the instrument placed over the buoy 7, the silk cord is then stretched or extended to aline or pass through the center of the buoy 8, and by reading off the dial or disk 17, the exact point where the cord passes over or through the graduations of the dial, will disclose the true course of the vessel, which, as shown in Fig. 2, is east by north, the course or direction the vessel is to be steered or guided. The instrument after having once been set according to the variations of the compass of a particular section of a chart, need not be readjusted, in order to find the course between any other two points on the same section of chart. Of course, however, should another section of chart with different variations be used, the instrument or protractor must be readjusted according to the variations thereon.

The invention having been set forth, what is claimed as new and useful, is:—

1. In a device for finding courses, the combination of a blade and a circular disk on one end having an annular depression on one face, of a head transversely arranged and slidably adjustable on the blade, a direction dial pivoted in said depression, and means for holding the dial in adjusted position according to the variations of a chart compass.

2. In a device for finding courses, the combination of a blade and a circular disk on one end having an annular depression on one face, of a head transversely arranged and slidably adjustable on the blade, a direction dial pivoted in said depression, and means for holding the dial in adjusted position according to the variations of a chart compass, and a device having swiveled connections on said means to extend between two predetermined points on a chart and extend radially from the center of the dial to determine the course relative to the variation as set on the dial.

3. In a course finder, a direction dial, a holder therefor, and a thumb screw whereby the dial may be held set according to the variations between the true and magnetic norths of a compass of a chart, said thumb screw having a tapering base, a ring swiveled on the tapering base, the taper of which prevents upward displacement of the ring, and means attached to the ring and designed to extend between two predetermined points on a chart and extending radially across the dial to find the course of a vessel relative to said variations.

In testimony whereof I have signed my name to this specification in the presence of two subscribing witnesses.

WILLIAM M. SISTARE.

Witnesses:
W. E PATTERSON,
GEORGE D. PACKER.